United States Patent
Kitajima et al.

[11] Patent Number: 6,071,846
[45] Date of Patent: *Jun. 6, 2000

[54] OLEFIN POLYMERIZATION CATALYST AND A POLYOLEFIN PRODUCTION METHOD

[75] Inventors: Yoshiyuki Kitajima; Katsufumi Tsuboi; Junichi Ito, all of Tokuyama, Japan

[73] Assignee: Tokuyama Corporation, Yamaguchi-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/635,629

[22] Filed: Apr. 22, 1996

[30] Foreign Application Priority Data

Apr. 24, 1995 [JP] Japan .................... 7-098957

[51] Int. Cl.$^7$ .................... B01J 37/00
[52] U.S. Cl. .................... 502/125; 526/119; 526/129; 502/108
[58] Field of Search .................... 502/108, 125; 526/119, 129

[56] References Cited

U.S. PATENT DOCUMENTS

| | | | |
|---|---|---|---|
| 4,305,840 | 12/1981 | Zucchini et al. | 526/124.8 |
| 4,442,276 | 4/1984 | Kashiwa et al. | 526/124.8 |
| 4,990,479 | 2/1991 | Shimaru et al. | 502/125 |
| 5,034,484 | 7/1991 | Demiddeler et al. | 502/119 |
| 5,147,839 | 9/1992 | Fujita et al. | 526/124.8 |
| 5,177,043 | 1/1993 | Koyama et al. | 502/125 |

FOREIGN PATENT DOCUMENTS

| | | |
|---|---|---|
| 0 196 585 | 10/1986 | European Pat. Off. . |
| 0 281 524 | 9/1988 | European Pat. Off. . |
| 0 437 080 A1 | 7/1991 | European Pat. Off. . |
| 0 448 115 A3 | 9/1991 | European Pat. Off. . |
| 0 480 434 A2 | 4/1992 | European Pat. Off. . |
| 0 522 423 A3 | 1/1993 | European Pat. Off. . |
| 0 570 199 A1 | 11/1993 | European Pat. Off. . |
| 2 656 313 | 6/1991 | France . |
| 56-136806 | 10/1981 | Japan . |
| 56-155206 | 12/1981 | Japan . |
| 57-34103 | 2/1982 | Japan . |
| 58-8706 | 1/1983 | Japan . |
| 58-83006 | 5/1983 | Japan . |
| 58-138708 | 8/1983 | Japan . |
| 58-183709 | 10/1983 | Japan . |
| 59-206408 | 11/1984 | Japan . |
| 59-219311 | 12/1984 | Japan . |
| 60-81208 | 5/1985 | Japan . |
| 60-81209 | 5/1985 | Japan . |
| 60-186508 | 9/1985 | Japan . |
| 60-192708 | 10/1985 | Japan . |
| 61-211309 | 9/1986 | Japan . |
| 61-271304 | 12/1986 | Japan . |
| 62-11706 | 1/1987 | Japan . |
| 62-15209 | 1/1987 | Japan . |
| 62-72702 | 4/1987 | Japan . |
| 62-104810 | 5/1987 | Japan . |
| 63-202603 | 8/1988 | Japan . |
| 63-202604 | 8/1988 | Japan . |
| 2-229805 | 9/1990 | Japan . |
| 6-345815 | 12/1994 | Japan . |

*Primary Examiner*—David W. Wu
*Assistant Examiner*—Ling-Siu Choi
*Attorney, Agent, or Firm*—Birch, Stewart, Kolasch & Birch, LLP

[57] ABSTRACT

An olefin polymerization catalyst comprising (A) a solid titanium catalyst component containing a magnesium atom, titanium atom, halogen atom and electron donor, in which divalent titanium atom account for not more than 25 atomic % of the whole titanium atom and trivalent titanium atom account for at least 30 atomic % of the whole titanium atom and (B) an organoaluminum compound component having no halogen atom; and an olefin production method which comprises polymerizing an olefin in the presence of the above olefin polymerization catalyst.

16 Claims, No Drawings

OLEFIN POLYMERIZATION CATALYST AND A POLYOLEFIN PRODUCTION METHOD

DETAILED DESCRIPTION OF THE INVENTION

1. Field of the Invention

This invention relates to a novel catalyst for olefin polymerization and to a method for the production of polyolefin using the same. More specifically, it relates to an olefin polymerization catalyst which exhibits high stereoregularity and high polymerization activity in the polymerization of olefins containing α-olefins having at least 3 carbon atoms and to a polyolefin production method by which a polyolefin having high stereoregularity can be produced at a high yield using the above catalyst.

2. Prior Art

A Ziegler-Natta catalyst which comprises an organoaluminum compound such as diethyl aluminum chloride or trialkyl aluminum and a solid titanium compound such as titanium trichloride or titanium tetrachloride is known as an olefin polymerization catalyst, and a method for improving the polymerization activity and stereoregularity of this catalyst is known. Especially, the polymerization activity of the catalyst is greatly improved by using, as the solid titanium compound, a solid titanium compound supported on a carrier, which comprises a tetravalent titanium atom, a magnesium atom and a halogen atom as essential ingredients.

However, when an olefin such as propylene is polymerized using this catalyst, the resulting polymer has extremely low stereoregularity though it has high activity. Therefore, the catalyst is of little practical value.

To cope with the above drawback, there has been proposed a method for improving the stereoregularity by incorporating an electron donor (internal donor) such as esters and ethers in the solid titanium compound containing a tetravalent titanium atom, magnesium atom and halogen atom.

In addition to the catalyst comprising such as solid titanium compound and an organoaluminum compound, further improvement of the stereoregularity has been carried out by addition of an electron donor (external donor) such as esters, ethers, amines and organosilicon compounds.

Although the stereoregularity of a polymer obtained by the above method is considerably improved, the method has such a defect that the polymerization activity of the catalyst is drastically reduced by the addition of a large amount of an electron donor. Therefore, this approach is far from reaching a level satisfying both polymerization activity and stereoregularity at the same time.

Heretofore, various olefin polymerization catalysts and polyolefin production methods using these catalysts have been proposed to achieve polymerization activity and stereoregularity at the same time.

JP-A-63-202603 (the term "JP-A" as used herein means an "unexamined published Japanese patent application") discloses an α-olefin polymerization method which comprises the steps of pre-polymerizing an α-olefin in the presence of a catalyst formed at least of (A) a highly active titanium solid catalyst component comprising magnesium, titanium and halogen as essential ingredients, (B) an organometallic compound catalyst component comprising metal (s) of group 1 or 3 of the periodic table, and (C) a transition metal compound catalyst component which is soluble in an inert organic medium, and polymerizing an α-olefin in the presence of the resulting α-olefin pre-polymerization catalyst.

JP-A-63-202604 discloses a polymerization method which uses an organic halogen compound catalyst component in place of the transition metal compound catalyst component (C) in the above α-olefin pre-polymerization method disclosed in JP-A-63-202603.

JP-A-2-229805 teaches an olefin polymerization method which comprises pre-polymerizing an olefin in the presence of a catalyst which comprises (i) a solid titanium catalyst component containing magnesium, titanium, a halogen and an electron donor as essential ingredients, (ii) a halogen-containing organoaluminum compound catalyst component, and (iii) an organosilicon compound catalyst component to prepare a pre-polymerization catalyst (A), and (co) polymerizing an olefin in the presence of an olefin polymerization catalyst which is formed of (A) the pre-polymerization catalyst and (B) an organoaluminum catalyst component.

JP-A-6-345815 discloses an olefin polymerization catalyst which comprises (A) a solid catalyst component for use as an olefin stereoregularity polymerization catalyst which is obtained by bringing (i) a solid catalyst component containing titanium, magnesium and halogen as essential ingredients and a silicon compound represented by the following formula:

$R^1R^2_m Si(OR^3)_{3-m}$ wherein $R^1$ is $-C(CH_3)^2[CH(CH_3)_2]$, $R^2$ is a residual straight-chain hydrocarbon group, $R^3$ is a residual $C_{1-20}$ hydrocarbon group, and m is a number that satisfies $0 \leq m \leq 1$, while substantially retaining its structure, into contact with (ii) a halogen-containing organoaluminum compound represented by the following formula:

$AlR^4_{3-n}X_n$ wherein $R^4$ is a residual $C_{1-20}$ hydrocarbon group, X is halogen, and n is a number that satisfies $0<n \leq 3$, and (B) an organoaluminum compound.

However, it cannot be said that polymerization activity achieved by these methods is satisfactory and there is yet room for improvement.

SUMMARY OF THE INVENTION

It is therefore a first object of the present invention to provide an olefin polymerization catalyst which allows a polyolefin to have high stereoregularity and high polymerization activity.

It is a second object of the present invention to provide a method for producing a polyolefin having high stereoregularity at a high yield using the above olefin polymerization catalyst.

Other objects and advantages of the present invention will become apparent from the following description.

DETAILED DESCRIPTION OF THE INVENTION

According to the present invention, the above objects and advantages of the present invention can be attained first by an olefin polymerization catalyst which comprises (A) a solid titanium catalyst component coprising a magnesium atom, titanium atom, halogen atom and electron donor, in which divalent titanium atom accounts for not more than 25 atomic % of the whole titanium atom and trivalent titanium atom accounts for at lease 30 atomic %, and (B) an organoaluminum compound component having no halogen atom. The above objects and advantages of the present invention can be attained secondly by a polyolefin production method which comprises polymerizing an olefin in the presence of the above olefin polymerization catalyst.

The olefin polymerization catalyst of the present invention, as described above, comprises a solid titanium catalyst component (A) and an organoaluminum compound component having no halogen atom (B).

In the titanium atom contained in the solid titanium catalyst component (A), divalent titanium atom accounts for not more than 25 atomic % and trivalent titanium atom accounts for at least 30 atomic %.

The divalent titanium atom is preferably contained in an amount of not more than 23 atomic %, more preferably not more than 21 atomic %, particularly preferably not more than 20 atomic % and the most preferably 5 to 20 atomic %.

The trivalent titanium atom is preferably contained in an amount of at least 32 atomic %, more preferably at least 35 atomic %, particularly preferably at least 40 atomic % and the most preferably 40 to 60 atomic %.

Further, the titanium atom contained in the solid titanium catalyst component (A) preferably include tetravalent titanium atom. The tetravalent titanium atom is preferably contained in an amount of at least 5 atomic %, more preferably at least 20 atomic %, more preferably 20 to 65 atomic % and the most preferably 20 to 60 atomic %.

In the present invention, the amounts of divalent and trivalent titanium atoms were measured in accordance with a titration method described in J.P.S Polymer Chem. Ed. Vol. 20, pp.2019 to 2032 (1982) and the total amount of titanium was determined by absorptiometry. The amount of tetravalent titanium atom was obtained by subtracting the total of the amounts of divalent and trivalent titanium atom from the amount of the whole titanium atom.

When the proportion of divalent titanium atom is more than 25 atomic % of the titanium, or when the proportion of trivalent titanium atom is smaller than 30 atomic %, the solid titanium catalyst component (A) constitutes an olefin polymerization catalyst together with the organoaluminum compound and the object of the present invention cannot be attained because polymerization activity is low in the olefin polymerization.

Any solid titanium catalyst component in which the proportions of divalent and trivalent titanium atoms are within the above ranges is acceptable. To further improve activity after the solid titanium catalyst component has been supplied to a polymerization zone where an olefin is polymerized, it is preferred that the proportion of tetravalent titanium atom occupying the titanium is at least 5 atomic % as described above.

The inventors of the present invention pressume as follows about the reason that a conventional olefin polymerization catalyst does not have satisfactory polymerization activity in contrast to the olefin polymerization catalyst of the present invention having high polymerization activity due to the above solid titanium catalyst component being contained in the catalyst.

That is, in a solid titanium catalyst component obtained by pre-polymerizing an olefin in the presence of a reducing agent formed of an organoaluminum compound and a solid titanium compound containing tetravalent titanium atom, a reducing action on tetravalent titanium atom by the organoaluminum compound is strong, whereby the proportion of divalent titanium atom increases and the proportion of trivalent titanium atom decreases. A solid titanium catalyst component obtained by pre-polymerizing an olefin in the presence of the solid titanium compound containing tetravalent titanium atom, a halogenated organoaluminum compound and an organosilicon compound has an extremely small content of trivalent titanium atom before it is supplied to a polymerization zone. Even if trivalent titanium atom is formed by a reducing action caused by contact between the solid titanium catalyst component and the organoaluminum compound in the polymerization zone, a sufficient amount of the trivalent titanium atom cannot be made present, thereby making it difficult to obtain high polymerization activity. Further, a solid titanium catalyst component obtained by contacting a solid titanium compound containing tetravalent titanium atom with a halogenated organic aluminum also has a small content of trivalent titanium atom before it is supplied to the polymerization zone, thereby making it difficult to obtain high polymerization activity.

Thus, solid titanium catalyst components obtained by the prior art methods contain a large amount of divalent titanium or a small amount of trivalent titanium. Therefore, when they are used in combination with an organoaluminum compound to polymerize an olefin, it is difficult to obtain high catalytic activity which the present invention is directed to.

In the present invention, the above solid titanium catalyst component contains a magnesium atom, halogen atom and electron donor as essential ingredients, in addition to the above specified titanium atom.

These essential ingredients can be obtained by co-grinding a titanium compound, magnesium compound, electron donor and as required, a halogenating agent in accordance with a catalyst preparation method to be described hereinafter.

The content of each of the above essential ingredients differs depending on the preparation method and cannot be specified unconditionally. However, generally, the proportion of the magnesium atom is advantageously 5 to 30% by weight, that of the titanium atom 1 to 10% by weight, that of the halogen atom 30 to 70% by weight and that of the electron donor 1 to40% by weight.

In the present invention, an organoaluminum compound having no halogen atom is used as the organoaluminum compound component constituting the olefin polymerization catalyst to achieve high polymerization activity. Known organoaluminum compounds having no halogen atom may be used. For example, trialkyl aluminum represented by the following general formula (3) is used.

$$R_3Al \qquad \ldots (3)$$

wherein R is a saturated hydrocarbon group having 1 to 10 carbon atoms.

In the above general formula (3), R is a saturated hydrocarbon group having 1 to 10 carbon atoms. Illustrative examples of the saturated hydrocarbon group having 1 to 10 carbon atoms include chain and cyclic alkyl groups such as methyl, ethyl, propyl, isopropyl, butyl, isobutyl, sec-butyl, t-butyl, pentyl, isopentyl, neopentyl, hexyl, heptyl, octyl, nonyl, decyl, cyclopentyl or cyclohexyl groups.

Specific examples of the trialkyl aluminum compound particularly preferred include trimethyl aluminum, triethyl aluminum, tri-n-propyl aluminum, tri-n-butyl aluminum, tri-i-butyl aluminum, tri-n-hexyl aluminum, tri-n-octyl aluminum, tri-n-decyl aluminum and the like.

The ratio of the solid titanium catalyst component to the organoaluminum compound having no halogen atom is not particularly limited. Generally, the atomic ratio (Al/Ti) of aluminum atom contained in the organoaluminum compound component to titanium atom contained in the solid titanium catalyst component is preferably 10 to 1,000, particularly preferably 20 to 500.

The olefin polymerization catalyst of the present invention may contain other components as far as its characteristic properties are not deteriorated considerably. The other components include, for example, a halogenated organoaluminum compound which is inevitably contained in the preparation of a solid titanium catalyst component to be described hereinafter and a compound formed in the preparation of a solid titanium compound.

In the present invention, a solid titanium catalyst component obtained by any preparation method is acceptable as the solid titanium catalyst component as far as it satisfies the above specific requirements. A typical example of the preparation method is a method in which a solid titanium catalyst component is obtained by pre-polymerizing an olefin in the presence of a solid titanium compound (a) containing a magnesium atom, tetravalent titanium atom, halogen atom and electron donor as essential ingredients, a solid titanium compound obtained by bringing a halogenated organoaluminum compound (b) represented by the following general formula (1) into compact with an organosilicon compound (c) represented by the following general formula (2), and an organoaluminum compound having no halogen atom.

$$R_nAlX_{3-n} \quad \ldots (1)$$

wherein R is a saturated hydrocarbon group having 1 to 10 carbon atoms, X is a halogen atom and n is a number that satisfies 0<n<3.

$$R^1R^2Si(Or^3)_2 \quad \ldots (2)$$

wherein $R^1$, $R^2$ and $R^3$ are the same or different hydrocarbon groups having 1 to 20 carbon atoms, provided that at least one of $R^1$ and $R^2$ is a chain hydrocarbon group having a tertiary carbon atom directly bonded to a silicon atom or a cyclic hydrocarbon group having a secondary carbon atom directly bonded to a silicon atom.

In this respect, any known solid titanium compound containing a magnesium atom, tetravalent titanium atom, halogen atom and electron donor as essential ingredients may be used as the above solid titanium compound (a) with restriction. A number of methods for producing the above solid titanium compound have been proposed heretofore. Solid titanium compounds obtained by these known methods can be used in the present invention without restriction. The methods include, for example, a method in which a titanium compound such as tetrahalogenated titanium and a magnesium compound are co-ground in the presence of an electron donor, a method in which a titanium compound, a magnesium compound and an electron donor are allowed to contact with one another in a solvent, and the like.

These methods for preparing a solid titanium compound are disclosed in detail in JP-A-56-155206, JP-A-56-136806, JP-A-57-34103, JP-A-58-8706, JP-A-58-83006, JP-A-58-138708, JP-A-58-183709, JP-A-59-206408, JP-A-59-219311, JP-A-60-81208, JP-A-60-81209, JP-A-186508, JP-A-60-192708, JP-A-61-211309, JP-A-61-271304, JP-A-62-15209, JP-A-62-11706, JP-A-72702, JP-A-62-104810 and the like.

The titanium compound used in the preparation of the above solid titanium compound is a tetravalent titanium compound. The tetravalent titanium compound may be, for example, selected from tetrahalogenated titanium, tetraalkoxy titanium, trihalogenated alkoxy titanium, dihalogenated dialkoxy titanium, halogenated trialkoxy titaniums and the like. Specific examples of the compound include tetrachlorotitanium, tetrabromtitanium, tetraiodetitanium, tetramethoxytitanium, tetraethoxytitanium, tetra-n-propoxytitanium, tetra-i-propoxytitanium, tetra-n-butoxytitanium, tetra-i-butoxytitanium, tetra-n-hexyloxytitanium, tetra-n-octyloxytitanium, trichloroethoxytitanium, dichlorodiethoxytitanium, triethoxycyclotitanium, trichloro-n-butoxytitanium, dichloro-di-n-butoxytitanium, tri-n-butoxycyclotitanium and the like.

The magnesium compound used in the preparation of the above solid titanium compound may be, for example, selected from halogenated magnesium such as magnesium chloride; alkoxy magnesium such as magnesium diethoxide; alkoxy magnesium halide; magnesium oxide; magnesium hydroxide; magnesium carboxylates and the like.

Further, the electron donor used in the preparation of the solid titanium compound may be exemplified by alcohols, phenols, ketones, aldehydes, carboxylic acid, organic acid halides, organic or inorganic acid esters, ethers, acid amides, acid anhydrides, ammonium, amines, nitriles, isocyanates and the like.

Among these, organic acid esters are preferred and compounds having two or more ester bonds in the molecule are particularly preferred.

Specific examples of the compound having two or more ester bonds in the molecule include aliphatic polycarboxylic esters such as diethyl succinate, dibutyl succinate, methyldiethylsuccinate, α-methyldiisobutylglutarate, methyldiethylmalonate, ethyldiethylmalonate, isopropyldiethylmalonate, butyldiethylmalonate, phenyldiethylmalonate, diethyldiethylmalonate, dibutyldiethylmalonate, monooctyl maleate, dioctyl maleate, dibutyl maleate, butyldibutylmaleate, butyldiethylmaleate, β-methyldiisopropylglutarate, ethyldiallylsuccinate, di-2-ethylhexylfumarate, diethylitaconate and dioctylcitraconate; alicyclic polycarboxylic esters such as 1,2-cyclohexanediethylcarboxylate, 1,2-cyclohexanediisobutylcarboxylate, tetrahydrodiethylphthalate and diethylnadic acid easter; aromatic polycarboxylic esters such as monoethyl phthalate, dimethyl phthalate, methylethylphthalic acid, monoisobutyl phthalate, diethyl phthalate, ethylisobutyl phthalate, ethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecylphthalate, benzylbutyl phthalate, diphenyl phthalate, naphthalene diethyldicarboxylate, naphthalene dibutyldicarboxylate, triethyl trimellitate and dibutyl trimellitate; and the like.

Other examples of the compound having two or more ester bonds in the molecule include long-chain dicarboxylic esters such as diethyl adipate, diisobutyl adipate, diisopropyl sebacate, di-n-butyl sebacate, di-n-octyl sebacate, di-2-ethylhexyl sebacate and the like.

Among these, phthalic esters are preferred because they are effective in achieving the effect of the present invention.

A compound represented by the above general formula (1) may be used without restriction as the halogenated organoaluminum compound (b) to be contacted with the above solid titanium compound (a).

The saturated hydrocarbon group having 1 to 10 carbon atoms, represented by R in the formula (1), may be, for example, selected from chain and cyclic alkyl groups such as methyl, ethyl, propyl, isopropyl, butyl, isobutyl, sec-butyl, t-butyl, pentyl, isopentyl, neopentyl, hexyl, heptyl, octyl, nonyl, decyl, cyclopentyl and cyclohexyl. The halogen atom represented by X in the formula (1) may be, for example, fluorine, chlorine, bromine and iodine.

Preferred specific examples of the halogenated organic aluminum include ethyl aluminum dichloride, ethyl aluminum sesquichloride, diethyl aluminum chloride, diethyl aluminum bromide, diethyl aluminum iodide, diisobutyl aluminum chloride, di-n-propyl aluminum chloride, ethyl aluminum dibromide, ethyl aluminum diiodide, isobutyl aluminum dichloride, isobutyl aluminum dibromide, isobutyl aluminum diiodide and the like. Among these, diethyl aluminum chloride, ethyl aluminum sesquichloride and ethyl aluminum dichloride are preferred.

The amount of the above halogenated organoaluminum compound used is not particularly limited. However, the atomic ratio (Al/Ti) of aluminum atom contained in the halogenated organoaluminum compound to titanium atom contained in the solid titanium compound to be contacted therewith is preferably 0.1 to 100, more preferably 0.5 to 10.

Further, a compound represented by the above general formula (2) may be used as the organosilicon compound (c) to be contacted with the above solid titanium compound (a) without restriction.

Illustrative examples of the hydrocarbon group having 1 to 20 carbon atoms, represented by $R^1$, $R^2$ and $R^3$ in the formula (2), include methyl, ethyl, propyl2, isopropyl, butyl, isobutyl, sec-butyl, pentyl, isopentyl, neopentyl, hexyl, heptyl, octyl, nonyl and decyl groups, as well as cyclopentyl, alkyl group-substituted cyclopentyl, cyclohexyl, alkyl group-substituted cyclohexyl, t-butyl and t-amyl groups, and the like to be described hereinafter.

Illustrative examples of the chain hydrocarbon group having a tertiary carbon atom directly bonded to a silicon atom, represented by at least one of $R^1$ and $R^2$ in the formula (2), include t-butyl group, t-amyl group and the like. Illustrative examples of the cyclic hydrocarbon group having a secondary carbon atom directly bonded to a silicon atom include cyclopentyl, 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl, tetraethylcyclopentyl, cyclohexyl, 2-methylcyclohexyl, 3-methylcyclohexyl, 4-methylcyclohexyl, 2-ethylcyclohexyl, 2,3-dimethylcyclohexyl, 2,4-dimethylcyclohexyl, 2,5-dimethylcyclohexyl, 2,6-dimethylcyclohexyl, 2,3-diethylcyclohexyl, 2,3,4-trimethylcyclohexyl, 2,3,5-trimethylcyclohexyl, 2,3,6-trimethylcyclohexyl, 2,4,5-trimethylcyclohexyl, 2,4,6-trimethylcyclohexyl, 2,3,4-triethylcyclohexyl, 2,3,4,5-tetramethylcyclohexyl, 2,3,4,6-tetramethylcyclohexyl, 2,3,5,6-tetramethylcyclohexyl, 2,3,4,5-tetraethylcyclohexyl, pentamethylcyclohexyl and pentaethylcyclohexyl groups, and the like.

Specific examples of the organosilicon compound include di-t-butyl dimethoxysilane, t-butylethyl dimethoxysilane, di-t-amyl dimethoxysilane, dicyclopentyl dimethoxysilane, dicyclohexyl dimethoxysilane, di(2-methylcyclopentyl) dimethoxysilane, di(3-methylcyclopentyl)dimethoxysilane, di(2-ethylcyclopentyl)dimethoxysilane, di(2,3-dimethylcyclopentyl)dimethoxysilane, di(2,4-dimethylcyclopentyl)dimethoxysilane, di(2,5-dimethylcyclopentyl)dimethoxysilane, di(2,3-diethylcyclopentyl)dimethoxysilane, di(2,3,4-trimethylcyclopentyl)dimethoxysilane, di(2,3,5-trimethylcyclopentyl)dimethoxysilane, di(2,3,4-triethylcyclopentyl)dimethoxysilane, di(tetramethylcyclopentyl)dimethoxysilane, di(tetraethylcyclopentyl)dimethoxysilane, di(2-methylcyclohexyl)dimethoxysilane, di(3-methylcyclohexyl) dimethoxysilane, di(4-methylcyclohexyl)dimethoxysilane, di(2-ethylcyclohexyl)dimethoxysilane, di(2,3-dimethylcyclohexyl)dimethoxysilane, di(2,4-dimethylcyclohexyl)dimethoxysilane, di(2,5-dimethylcyclohexyl)dimethoxysilane, di(2,6-dimethylcyclohexyl)dimethoxysilane, di(2,3-diethylcyclohexyl)dimethoxysilane, di(2,3,4-trimethylcyclohexyl)dimethoxysilane, di(2,3,5-trimethylcyclohexyl)dimethoxysilane, di(2,3,6-trimethylcyclohexyl)dimethoxysilane, di(2,4,5-trimethylcyclohexyl)dimethoxysilane, di(2,4,6-trimethylcyclohexyl)dimethoxysilane, di(2,3,4-triethylcyclohexyl)dimethoxysilane, di(2,3,4,5-tetramethylcyclohexyl)dimethoxysilane, di(2,3,4,6-tetramethylcyclohexyl)dimethoxysilane, di(2,3,5,6-tetramethylcyclohexyl)dimethoxysilane, di(2,3,4,5-tetraethylcyclohexyl)dimethoxysilane, di(pentamethylcyclohexyl)dimethoxysilane, di(pentaethylcyclohexyl)dimethoxysilane, t-butylmethyl dimethoxysilane, t-butylethyl dimethoxysilane, t-amylmethyl dimethoxysilane, cyclopentylmethyl dimethoxysilane, cyclopentylethyl dimethoxysilane, cyclopentylisobutyl dimethoxysilane, cyclohexylmethyl dimethoxysilane, cyclohexylethyl dimethoxysilane, cyclohexylisobutyl dimethoxysilane and the like. Among these, cyclohexylmethyl dimethoxysilane, dicyclopentyl dimethoxysilane, t-butylethyl dimethoxysilane and the like are preferred.

The amount of the organosilicon compound (c) used is not particularly limited. However, the atomic ratio (Si/Ti) of silicon atom contained in the organosilicon compound to titanium atom contained in the solid titanium compound to be contacted therewith is preferably 0.01 to 100, more preferably 0.05 to 10.

The solid titanium compound (a), the halogenated organoaluminum compound (b) and the organosilicon compound (c) may be contacted with one another in the co-presence of other component(s) as far as the effect of the present invention is recognized.

In the present invention, a method for allowing the above solid titanium compound (a), halogenated organoaluminum compound (b) and organosilicon compound (c) to contact with one another is not particularly limited, provided that the halogenated organoaluminum compound and the organosilicon compound are at least contacted with the solid titanium compound.

Generally, the contact is preferably carried out in a slurry. Specifically, saturated aliphatic and aromatic hydrocarbons such as hexane, heptane, pentane, cyclohexane, benzene or toluene are used alone or in combination as a solvent to mix the above three components therein.

In this case, the concentration of the solid content in the slurry is preferably 0.1 to 50 g/l. When the concentration of the solid content (to be referred to as "slurry concentration" hereinafter) is below the above range, the contact is liable to be insufficient, and when the slurry concentration is beyond the above range, the contact is liable to be nonuniform.

The contact temperature is not particularly limited if it does not reduce the effect of the present invention considerably. It is usually in the range of −20 to 100° C., particularly preferably 0 to 60° C.

The contact time may be determined suitably in accordance with the above slurry concentration. It is usually 1 to 180 minutes, preferably 5 to 120 minutes.

The contact may be carried out in a batch, semi-batch or continuous manner.

In the present invention, the solid titanium compound component obtained by the above contact may be used either without washing the halogenated organoaluminum compound and the organosilicon compound used in the contact or by removing these components by washing.

A solvent formed of a saturated aliphatic or aromatic hydrocarbon such as hexane, heptane, pentane, cyclohexane, benzene or toluene, or a mixture thereof may be used in the washing.

In this case, the washing can be repeated until components other than the solid titanium compound component are substantially eliminated, preferably 5 to 6 times under normal conditions.

The preparation of the olefin polymerization catalyst of the present invention may be carried out by pre-polymerizing an olefin in the presence of the solid titanium compound component obtained by the above method and the organoaluminum compound having no halogen atom.

In the pre-polymerization in the presence of the organoaluminum compound having no halogen atom, at least part of tetravalent titanium atom contained in the solid titanium compound component are reduced to trivalent titanium atom.

In this case, in order to obtain a solid titanium catalyst in which the proportion of divalent titanium atom occupying the titanium is not more than 25 atomic % of the titanium and that of trivalent titanium atom is at least 30 atomic %, the method proposed in the present invention makes it possible to prevent tetravalent titanium atom from being excessively reduced by the organoaluminum compound in the pre-polymerization by in advance contacting a solid titanium compound with halogenated organic aluminum to allow the halogenated organoaluminum to be present on the surface of the solid titanium compound.

In contrast, when a reduction is carried out in the pre-polymerization by contacting the solid titanium compound directly with the organoaluminum compound, the reduction of tetravalent titanium atom contained in the solid titanium compound proceeds too far, whereby the proportion of divalent titanium atom greatly increases, thereby making it impossible to obtain the solid titanium catalyst component specified by the present invention.

The specific organosilicon compound to be contacted with the solid titanium compound together with the halogenated organoaluminum is assumed to have functions to increase the proportion of trivalent titanium atom and suppress the reduction of tetravalent titanium atom to divalent titanium atom and a function to provide high stereoregularity to the resulting olefin polymerization catalyst.

The solid titanium compound component thus treated is reduced using an organoaluminum compound having no halogen atom under mild conditions for pre-polymerization to be described hereinafter, whereby a solid titanium catalyst component having a small content of divalent titanium atom and an increased content of trivalent titanium atom can be obtained.

Known conditions may be employed as the olefin pre-polymerization conditions without restriction as far as the above effect is obtained.

Generally, trialkyl aluminum represented by the above general formula (1) can be used as the above organoaluminum compound used in the pre-polymerization. Preferred examples of the organoaluminum compound include triethyl aluminum, triisobutyl aluminum, a combination of triethyl aluminum or triisobutyl aluminum and diethyl aluminum chloride, ethyl aluminum sesquichloride or ethyl aluminum dichloride, and the like.

The amount of the organoaluminum compound used in the pre-polymerization is not particularly limited. However, the atomic ratio (Al/Ti) of aluminum atom contained in the organic aluminum to titanium atom contained in the solid titanium compound component is preferably 1 to 100, more preferably 3 to 10.

In the above pre-polymerization, other organoaluminum compound such as a halogenated organoaluminum compound may be co-present as far as it does not impede the functions of the above organoaluminum compound considerably. Generally, the proportion of the other organoaluminum compound is not more than 200% by weight based on the organoaluminum compound having no halogen atom.

In the above pre-polymerization, electron donors such as ethers, amines, amides, sulfur compounds, nitriles, carboxylic acids, acid amides, acid anhydrides, acid esters and organosilicon compounds can be present as required to control stereoregularity which the resulting solid titanium catalyst component provides a polyolefin, in addition to the solid titanium compound component and the organoaluminum compound. Among these, an organosilicon compound is preferred. Although the same compounds as those represented by the above general formula (2) may be used as the organosilicon compound, other examples thereof include dimethyl dimethoxysilane, diethyl dimethoxysilane, dipropyl dimethoxysilane, divinyl dimethoxysilane, diallyl dimethoxysilane, diphenyl dimethoxysilane, methylphenyl dimethoxysilane, methyltriethoxysilane, ethyltriethoxysilane, vinyltriethoxysilane, butyltriethoxysilane, pentyltriethoxysilane, isopropyltriethoxysilane, hexyltriethoxysilane, octyltriethoxysilane, dodecyltriethoxysilane, allyltriethoxysilane and the like. They may be used in combination of two or more.

The amount of the above organosilicon compound used in the pre-polymerization is not particularly limited. However, the atomic ratio (Si/Ti) of silicon atom contained in the organosilicon compound to titanium atom contained in the solid titanium compound component is preferably 0.1 to 10, more preferably 0.5 to 5.

The amount of the olefin to be polymerized in the pre-polymerization is 0.1 to 100 g, preferably 1 to 100 g, industrially advantageously 2 to 50 g, based on 1 g of the solid titanium compound component. Preferred examples of the olefin used in the pre-polymerization include straight-chain olefins such as ethylene, propylene, 1-butene, 1-pentene, 1-hexene and the like.

In this case, two or more of the above olefins may be used at the same time, or a different olefin may be used in each step when the pre-polymerization is carried out stepwise. To improve the stereoregularity of the resulting polymer, a specific single olefin is preferably used in an amount of at lest 90 mol %. Hydrogen may also be present in the pre-polymerization.

The above pre-polymerization is preferably carried out at a polymerization rate of 0.001 to 1.0 g of polymer/g-cat·min. To achieve a polymerization rate within the above range, slurry polymerization is the most advantageously employed. In this case, saturated aliphatic and aromatic hydrocarbons such as hexane, heptane, cyclohexane, benzene and toluene may be used alone or in combination as a solvent.

The temperature for the slurry polymerization is usually −20 to 100° C., particularly preferably 0 to 60° C. The pre-polymerization may be carried out at a different temperature in each step when it is carried out in multiple steps.

The polymerization time is suitably determined in accordance with the polymerization temperature and the polymerization amount. Further, although the polymerization pressure is not limited, it is usually on order of atmospheric pressure to 5 kg/cm$^2$.

The above pre-polymerization may be carried out in a batch, semi-batch or continuous manner.

As described above, the pre-polymerization method is carried out by a slurry polymerization, but it may be also carried out by a gas-phase polymerization or solvent-free polymerization.

The solid titanium catalyst component obtained by the above pre-polymerization is preferably washed using a saturated aliphatic or aromatic hydrocarbon such as hexane, heptane, cyclohexane, benzene or toluene, or a mixture thereof, so as to obtain an olefin polymerization catalyst having higher polymerization activity. The washing is preferably repeated 5 to 6 times in an ordinary case.

A known method may be employed to polymerize an olefin using the olefin polymerization catalyst of the present invention, which comprises the solid titanium catalyst component obtained by the above method and the organoaluminum compound having no halogen atom. Generally, however, the following method is preferred.

Any organoaluminum compound containing an organoaluminum compound having no halogen atom as a main ingredient may be used as the above organoaluminum compound without restriction. Preferred examples of the organoaluminum compound include triethyl aluminum, triisobutyl aluminum, a combination of triethyl aluminum or triisobutyl aluminum and diethyl aluminum chloride, ethyl aluminum sesquichloride or ethyl aluminum dichloride, and the like. In this case, the amount of the halogenated organic aluminum used is preferably not more than 20% by weight based on the total of the components.

The amount of the organoaluminum compound used in the polymerization is not particularly limited. However, the atomic ratio (Al/Ti) of aluminum atom contained in the organoaluminum compound to titanium atom contained in the solid titanium catalyst is preferably 10 to 1,000, more preferably 20 to 500.

The polymerization rate in the polymerization is advantageously controlled to a range of 10 to 1,000 g of polymer/g-cat min, preferably 50 to 700 g of polymer/g of cat min.

The polymerization temperature is 20 to 200° C., preferably 50 to 150° C. and hydrogen may be present as a molecular weight modifier. The polymerization may be carried out by slurry polymerization, solvent-free polymerization and gas-phase polymerization in a batch, semi-batch or continuous manner. Further, the polymerization may be divided into two or more steps which differ in conditions.

The olefin to be subjected to the polymerization is an α-olefin such as ethylene, propylene, 1-butene, 1-pentene, 1-hexene, 1-decene or the like. The α-olefin may be used alone to obtain a polymer or two or more of the α-olefins may be mixed to obtain a random copolymer or a block copolymer. The polymerization may be exemplified by α-olefin homopolymerization such as ethylene homopolymerization, propylene homopolymerization or 1-butene homopolymerization; α-olefin random copolymerization such as ethylene-propylene random copolymerization, propylene-1-butene random copolymerization, ethylene-butene random copolymerization, ethylene-propylene-1-butene terpolymerization; and block copolymerization in which homopolymerization of propylene is carried out in the first step and copolymerization of propylene and ethylene in the second step.

To control the stereoregularity of an olefin having 3 or more carbon atoms, electron donors such as ethers, amines, amides, sulfur compounds, nitriles, carboxylic acids, acid amides, acid anhydrides, acid esters and organosilicon compounds may further be present in the polymerization. Among these, organosilicon compounds are preferred. The compound which can be used in the above pre-polymerization can be used as the organosilicon compound without restriction.

The amount of the organosilicon compound used in the polymerization is not particularly limited. However, the atomic ratio (Si/Ti) of silicon atom contained in the organosilicon compound to titanium atom contained in the solid titanium catalyst is preferably 0.1 to 1,000, more preferably 1 to 100. The order of adding the components used in the polymerization is not particularly limited. A mixture of the organoaluminum compound and the organosilicon compound may be used.

The present invention also provides a method for carrying out the above polyolefin production method industrially advantageously. In some cases, when a solid titanium catalyst component and a starting material olefin as a carrier are supplied to a polymerization zone in a polymerizer, polymerization of olefin may take place in a feed pipe before the solid titanium catalyst component reaches the polymerization zone. The present invention also provides a polyolefin production method which can prevent such a phenomenon effectively.

Some means for solving the above problem have been proposed so far. For instance, JP-A-54-139691 teaches a method in which a pre-polymerization catalyst formed into a slurry in an inert hydrocarbon medium is cooled to −50 to 10° C. and supplied to a polymerizer while the polymerization reaction rate is controlled, JP-A-59-140205 discloses a method in which a solid titanium catalyst component is introduced into a catalyst feed pipe together with part of an α-olefin and supplied to a polymerization zone while turbulence inside the pipe is maintained so as to suppress adhesion of the catalyst component to the wall of the pipe. Further, JP-A-61-254609 proposes a method in which a saturated or unsaturated carboxylic ester is added in advance to a solid titanium catalyst component and thereafter, the resulting mixture is supplied to a polymerization zone.

However, all of the above methods are not sufficiently effective in controlling the polymerization in the pipe, which occurs during the supply of a pre-polymerization catalyst having high polymerization activity to the polymerization zone and moreover, have the problem with the polymerization activity of the catalyst after it come into contact with an electron donor such as a carboxylic ester and the like.

The inventors of the present invention have found that the polymerization capability of the solid titanium catalyst component to olefin can be suitably controlled by contacting it with a halogenating agent and that the solid titanium catalyst component exhibits its inherent high polymerization activity in the polymerization zone, thereby making it possible to produce a polyolefin efficiently.

In other words, according to the present invention, there is also provided a polyolefin production method which comprises supplying, together with a olefin, a solid titanium catalyst component and an organoaluminum compound having no halogen atom through separate feed pipes to the polymerization zone to produce a polyolefin, wherein the solid titanium catalyst component is brought into contact with a halogenating agent and then supplied to the polymerization zone.

As the halogenating agent used in the present invention, a compound which can convert the same aluminum compound as that used in the preparation of a solid titanium catalyst component, particularly trialkyl aluminum, into a halogenated aluminum or a compound which can be converted into a halogenated aluminum may be used without restriction. A particularly preferred halogenating agent does not reduce the polymerization activity of the solid titanium catalyst component in the polymerization zone and hardly affects the polymerization activity of the solid titanium catalyst in the polymerization zone when an excess amount of the halogenating agent is used for contacting with the solid titanium catalyst component.

Illustrative examples of the halogenating agent include:
(1) a halogen compound represented by the following general formula (4);

$$X_2 \qquad (4)$$

(wherein X is a halogen atom);
(2) a dihalogenated alkyl aluminum represented by the following general formula (5) or a halogenated sesquialkyl aluminum:

$$R_nAlX_{3-n} \qquad (5)$$

(wherein R is a hydrocarbon group having 1 to 20 carbon atoms, X is a halogen atom and n is a number that satisfies 0<n<2); and
(3) halogenated hydrocarbon compounds represented by the following general formula (6):

$$R{-}X \qquad (6)$$

(wherein R is a hydrocarbon group having 1 to 20 carbon atoms and X is a halogen atom).

In the above general formula (6), illustrative examples of the hydrocarbon group having 1 to 20 carbon atoms include chain and cyclic saturated hydrocarbon groups such as methyl, ethyl, propyl, isopropyl, butyl, isobutyl, sec-butyl, pentyl, isopentyl, neopentyl, hexyl, heptyl, octyl, nonyl, decyl, cyclopentyl, alkyl group-substituted cyclopentyl, cyclohexyl, alkyl group-substituted cyclohexyl, t-butyl and t-amyl groups; aromatic hydrocarbon groups such as phenyl, alkyl-substituted phenyl, benzyl and alkyl-substituted benzyl groups; and the like. Among these, t-butyl, sec-butyl, t-amyl and benzyl groups are particularly preferred.

Among these halogenating agents, particularly preferred specific examples are iodine, ethyl aluminum dichloride, ethyl aluminum sesquichloride, t-butyl chloride, sec-butyl chloride, benzyl chloride, ethyl iodide and the like. Among these, t-butyl chloride and sec-butyl chloride are particularly preferred to suppress polymerization in the catalyst feed pipe.

The amount of the halogenating agent used in the contact of the present invention is preferably determined by preliminarily obtaining its amount requiring for converting at least part of, preferably the whole of, trialkyl aluminum adsorbed to the solid titanium catalyst into a halogenated aluminum from experiments.

Generally, the amount is determined to be such an amount that the molar ratio of the halogenating agent to titanium atom contained in the solid titanium catalyst becomes 0.01 to 10, particularly 0.05 to 5.

In the present invention, a method for contacting the solid titanium catalyst component with the halogenating agent is not particularly limited. Preferably, the halogenating agent and the solid titanium catalyst components come into contact with each other in an inert hydrocarbon medium in a reactor bath provided separately, or the halogenating agent is introduced into the catalyst feed pipe for supplying the solid titanium catalyst component in a form of a slurry in an inert hydrocarbon medium to the polymerization zone so that the halogenating agent is allowed to contact with the solid titanium catalyst in the catalyst feed pipe.

Among these contact methods, preferred is a method in which a solid titanium catalyst component is contacted with a halogenating agent in a reactor bath provided separately, because the solid titanium catalyst component after contact can be separated from the inert hydrocarbon medium and then washed, and thereafter a slurry of the solid titanium catalyst component is prepared and supplied to a reaction zone thereby to reduce the amount of impurities such as halogen atom contained in the polyolefin obtained in the polymerization zone.

The inert hydrocarbon medium used for preparing a slurry of the above solid titanium catalyst may be, for example, selected from saturated aliphatic and aromatic hydrocarbons such as hexane, heptane, pentane, cyclohexane, benzene and toluene, and mixtures thereof. The concentration of the solid content of the slurry is preferably 0.1 to 50 g/l.

A saturated aliphatic or aromatic hydrocarbon such as hexane, heptane, pentane, cyclohexane, benzene or toluene or a mixture thereof may also be used to wash the solid titanium catalyst component. The washing may be carried out until the halogenating agent is substantially removed and preferably repeated 1 to 5 times in an ordinary case. The above operation of contacting the slurry may be carried out in a batch, semi-batch or continuous manner.

Other conditions for allowing the halogenating agent to contact with the solid titanium catalyst in the present invention are not particularly limited as far as the effect of the present invention is observed. The contact temperature is usually –40 to 100° C., preferably –20 to 40° C. The contact time is usually 1 to 180 minutes, preferably 5 to 120 minutes.

The reason that choking is prevented by the method of the present invention when the solid titanium catalyst component is supplied to the reaction zone is not completely clarified. It is assumed as follows. As for a solid titanium catalyst component obtained by a general pre-polymerization in which it is not contacted with a halogenating agent, since trialkyl aluminum and the like used in the pre-polymerization are addorbed to a catalyst and cannot be sufficiently removed by washing, the solid titanium catalyst component itself exhibits considerable polymerization capability when it contacts an olefin. In contrast, the polymerization capability of a solid titanium catalyst component obtained by the present invention is controlled even when it contacts an olefin because a trialkyl aluminum component adsorbed to the solid titanium catalyst component is converted into a halogenated alkyl aluminum or halogenated aluminum having no polymerization capability.

A method for supplying the solid titanium catalyst component which has been contacted with the halogenating agent to the polymerization zone is not particularly limited. However, a method for supplying the solid titanium catalyst component in a form of a slurry in an inert hydrocarbon medium to the polymerization zone, as described above, is advantageously employed.

The organoaluminum compound component as another catalyst component and an electron donor used as required may be introduce under pressure into the catalyst feed pipe to join together, or they may be introduceded under pressure and supplied separately. However, to suppress polymerization in the pipe for supplying the solid titanium catalyst component and to further enhance the polymerization activity of the solid titanium catalyst component in the polymerization zone, the organoaluminum compound component and the electron donor used as required are preferably supplied to the reaction zone independently of the solid titanium catalyst component.

In the above method for bringing the halogenating agent into contact with the solid titanium catalyst component in the catalyst feed pipe by introducing under pressure the halogenating agent into the catalyst feed pipe, the solid titanium catalyst slurry is preferably supplied stably as a constant flow in the catalyst feed pipe by a single or multiple plunger pump or the like.

In the supply of the solid titanium catalyst component, the linear speed of the solid titanium catalyst slurry can be further increased and the inert hydrocarbon medium and/or the olefin medium can be introduced to join together with the solid titanium catalyst component in the catalyst feed pipe to suppress polymerization in the catalyst feed pipe.

The temperature of the solid titanium catalyst slurry in the catalyst feed pipe is preferably maintained at a low temperature, preferably at −30 to 30° C.

EFFECT OF THE INVENTION

The polymerization of an olefin using the olefin polymerization catalyst of the present invention is industrially extremely advantageous because a polyolefin having high stereoregularity and extremely high polymerization activity can be obtained.

When the solid titanium catalyst component and the olefin are supplied to the reaction zone, the polymerization of the olefin in the catalyst feed pipe can be effectively prevented by bringing the halogenating agent into contact with the solid titanium catalyst component, thereby making possible stable supply of the catalyst. At the same time, the activity of the solid titanium catalyst component can be maintained at a high level, thereby making it possible to obtain a polymer having high stereoregularity and high polymerization activity with good particulate properties. The above and other industrial advantages are unfathomable.

EXAMPLES

The following examples and comparative examples are provided for the purpose of further illustrating the present invention but are in no way to be taken as limiting. The measurement methods used in the following examples are described hereinunder.

(1) Quantitative determination of divalent, trivalent and tetravalent titanium atoms The quantitative determination of divalent and trivalent titanium atoms was carried out in accordance with a titration method described in the Journal of Polymer Science: Polymer Chemistry Edition, Vol.20, pp.2019 (1982).

(a) 300 to 500 mg of a solid titanium catalyst component obtained by pre-polymerization was fully reacted with 10 ml of 0.1 M iron sulfate aqueous solution, 1 ml of a 85% phosphoric acid aqueous solution was added to the resulting reaction product, and 1 ml of 10% diphenyl amine-4-sodium sulfonate was further added as an indicator. This resulting mixture was titrated with a 2 mN aqueous solution of potassium dichromate (f=1.007) and a point of time when the light orange aqueous solution turned light green was taken as an end point.

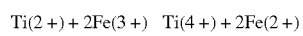

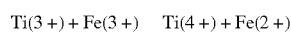

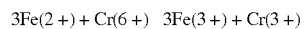

(b) 300 to 500 mg of a solid titanium catalyst component obtained by pre-polymerization was fully reacted with 10 ml of 2 N sulfuric acid, 10 ml of a 0.1 M iron sulfate aqueous solution and 1 ml of a 85% phosphoric acid aqueous solution were added to the reaction product, and 1 ml of 10% diphenylamine-4-sodium sulfonate was added as an indicator. This resulting mixture was titrated with a 2 mN aqueous solution of potassium dichromate (f=1.007) and a point of time when the light orange aqueous solution turned light green was taken as an end point.

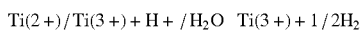

The quantities of divalent titanium atom and trivalent titanium atom were determined by the above titration methods (a) and (b). That is,

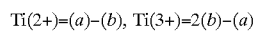

(c) 50 to 100 mg of a solid titanium catalyst component obtained by pre-polymerization was incinerated at about 500° C., 5 ml of a 3% hydrogen peroxide aqueous solution was added, and the resulting mixture was dissolved in a 1 N sulfuric acid aqueous solution. This aqueous solution was measured for its absorbance at 410 nm using an UV-visible spectrophotometer (model UV-3100S) supplied by Shimadzu Corporation and the total amount of titanium atom. Then, the quantity of tetravalent titanium atom was obtained from the following equation.

(2) p-xylene soluble content 1 g of a polymer was added to 100 cc of p-xylene and heated up to 120° C. under stirring. Stirring was continued for another 30 minutes to completely dissolve the polymer, and then the p-xylene solution was left to stand at 23° C. for 24 hours. The precipitate was removed by filtration and a soluble content was obtained by thoroughly concentrating the p-xylene solution.

p-xylene soluble content (%) at room temperature=(p-xylene soluble content (g)/1 g of polymer)×100

(3) Melt index (to be abbreviated as MI hereinafter)

Measured in accordance with ASTM D-790.

(4) Bulk density

Measured in accordance with JIS K6721.

(5) Evaluation on reactivity of solid titanium catalyst component with propylene Reactivity of a solid titanium catalyst component with propylene was evaluated as an index for choking in the feed pipe for supplying the solid titanium catalyst component to the polymerization zone.

That is, 500 ml of refined n-hexane and 0.5 mmol, as calculated as titanium atom, of a solid titanium catalyst obtained by pre-polymerization were introduced into an autoclave of which the internal volume was 1 liter and the inside was substituted with $N_2$ (which is referred to simply as "a 1-liter autoclave substituted with $N_2$" hereinafter) and thereafter propylene was introduced into the autoclave at a rate of 45 mmol/min. for 1 hour, under stirring. The temperature during this time was maintained at 10° C. Supply of propylene was stopped after 1 hour and the autoclave was fully substituted with $N_2$. The amount of a polymer polymerized per 1 g of the pre-polymerization catalyst component was calculated by sampling to evaluate reactivity of the pre-polymerization catalyst with propylene.

EXAMPLE 1

[preparation of solid titanium compound]

A method for preparing a solid titanium compound was carried out in accordance with the method of Example 1 of JP-A-58-83006.

That is, 0.95 g (10 mmol) of anhydrous magnesium chloride, 10 ml of decane and 4.7 ml (30 mmol) of 2-ethylhexyl alcohol were heated and stirred at 125° C. for 2 hours. To this solution was added 0.55 g (6.75 mmol) of phthalic anhydride, and mixing under stirring was carried out at 125° C. for another 1 hour to prepare a uniform solution. After cooling to room temperature, the whole amount of the uniform solution was added dropwise into 40 ml (0.36 mol) of titanium tetrachloride maintained at 120° C. over 1 hour. Thereafter, the temperature of the resulting mixed solution was elevated to 110° C. over 2 hours and, when it reached 110° C., 0.54 ml of diisobutyl phthalate was added and maintained at 110° C. for 2 hours under stirring. After completion of 2 hours of reaction, the resulting product was filtered to collect a solid content. After the solid content was re-suspended in 200 ml of $TiCl_4$, reaction was carried out again at a temperature of 110° C. for 2 hours. After completion of the reaction, the solid content was collected again by thermal filtration and thoroughly washed with decane and hexane until a free titanium compound was not detected in the washing liquid. The solid titanium compound was composed of 2.1% by weight of titanium, 57% by weight of chlorine, 18.0% by weight of magnesium and 21.9% by weight of diisobutyl phthalate.

[contact treatment]

200 ml of refined n-hexane, 50 mmol of diethyl aluminum chloride, 2.5 mmol of cyclohexylmethyl dimethoxysilane and 5 mmol, calculated as Ti atom, of a solid titanium compound as shown in Table 1 were charged into a 1-liter autoclave substituted with $N_2$. The temperature was maintained at 15° C. and these were stirred for 30 minutes to effect a contact treatment. A solid content of the resulting slurry was washed four times with refined n-hexane to obtain a solid titanium compound component.

[pre-polymerization]

200 ml of refined n-hexane, 50 mmol of triethyl aluminum and 5 mmol, calculated as Ti atom, of a solid titanium compound component subjected to a contact treatment were charged into a 1-liter autoclave substituted with $N_2$, and about 2 g of propylene per 1 g of the solid titanium compound component was introduced continuously into the autoclave for 30 minutes. The temperature during this time was maintained at 10° C. The reaction was stopped after 30 minutes and the autoclave was fully substituted with $N_2$. A solid content of the resulting slurry was washed four times with refined n-hexane to obtain a solid titanium catalyst compound. When the solid titanium catalyst compound was analyzed, it was found that 2.1 g of propylene was polymerized per 1 g of the solid titanium compound component. The above conditions are summarized in Table 1 and the proportion of each of divalent, trivalent and tetravalent titanium atoms contained in the solid titanium catalyst component is shown in Table 2.

[polymerization]

1.0 liter of propylene, 1.1 mmol of triethyl aluminum and 0.11 mmol of cyclohexylmethyl dimethoxysilane were charged into a 2-liter autoclave substituted with $N_2$ and a hydrogen gas was further added to the autoclave such that its amount became 0.9 mol % in terms of gas concentration in a gaseous phase. The temperature inside the autoclave was elevated to 65° C. and $4.38 \times 10^{-3}$ mmol, in terms of titanium atom, of the solid titanium catalyst component obtained by the above pre-polymerization was charged into the autoclave. Subsequently, the temperature inside the autoclave was further elevated to 70° C. and polymerization was carried out for 2 hours. After completion of the polymerization, unreacted propylene was purged to obtain a white particulate polymer. The thus obtained polymer was vacuum dried at 70° C. for 1 hour. Results are shown in Table 2.

EXAMPLE 2 TO 4

The procedure of Example 1 was repeated except that dicyclopentyl dimethoxysilane (Example 2), t-butylethyl dimethoxysilane (Example 3), and di-t-butyl dimethoxysilane (Example 4) were used in place of cyclohexylmethyl dimethoxysilane used in the contact treatment of Example 1. Contact treatment and pre-polymerization are summarized in Table 1 and results are shown in Table 2.

EXAMPLE 5

The procedure of Example 1 was repeated except that ethyl aluminum sesquichloride was used in place of diethyl aluminum chloride used in the contact treatment of Example 1. Contact treatment and pre-polymerization are summarized in Table 1 and results are shown in Table 2.

EXAMPLES 6 AND 7

The procedure of Example 1 was repeated except that the amount of diethyl aluminum chloride used in the contact treatment of Example 1 was changed to 10 mmol (Example 6) and 25 mmol (Example 7). Contact treatment and pre-polymerization are summarized in Table 1 and results are shown in Table 2.

EXAMPLES 8 AND 9

The procedure of Example 1 was repeated except that the contact treatment time of Example 1 was changed to 120 minutes (Example 8) and the contact temperature to 20° C. (Example 9). Contact treatment and pre-polymerization are summarized in Table 1 and results are shown in Table 2.

EXAMPLE 10

The procedure of Example 1 was repeated except that a washing step after the contact treatment was omitted. Contact treatment and pre-polymerization are summarized in Table 1 and results are shown in Table 2.

COMPARATIVE EXAMPLE 1

Pre-polymerization and polymerization were carried out in the same manner as in Example 1 except that the solid titanium compound obtained in the preparation of the solid titanium compound in Example 1 was not subjected to the contact treatment of Example 1. Pre-polymerization is summarized in Table 1 and results are shown in Table 2.

COMPARATIVE EXAMPLE 2

The procedure of Example 1 was repeated except that the solid titanium compound component obtained by the contact treatment of Example 1 was used in the polymerization without carrying out pre-polymerization in the presence of triethyl aluminum. Contact treatment is summarized in Table 1 and results are shown in Table 2.

COMPARATIVE EXAMPLE 3

The procedure of Example 1 was repeated except that the contact treatment of Example 1 was carried out in the presence of propylene in the following manner and pre-polymerization was not carried out in the presence of triethyl aluminum.

[contact treatment]

200 ml of refined n-hexane, 50 mmol of diethyl aluminum chloride, 2.5 mmol of cyclohexylmethyl dimethoxysilane and 5 mmol, calculated as titanium atom, of the solid titanium compound obtained in Example 1 were charged into a 1-liter autoclave substituted with $N_2$ and stirred for 30 minutes while the temperature was maintained at 15° C. Thereafter, propylene was introduced continuously into the autoclave for 30 minutes so as to keep its amount to 2 g per 1 g of the solid titanium catalyst component. A solid content of the thus obtained slurry was washed four times with refined n-hexane to obtain a solid titanium compound component subjected to a contact treatment. The result of analysis showed that 0.3 g of propylene was polymerized per 1 g of the solid titanium compound.

The thus obtained solid titanium compound component was used as a solid titanium catalyst and the same polymerization as in Example 1 was carried out. Contact treatment and pre-polymerization was summarized in Table 1 and results are shown in Table 2.

COMPARATIVE EXAMPLES 4 AND 5

The procedure of Example 1 was repeated except that cyclohexylmethyl dimethoxysilane was not used (Comparative Example 4) and diethyl aluminum chloride was not used (Comparative Example 5) in the contact treatment of Example 1. Contact treatment and pre-polymerization are summarized in Table 1 and results are shown in Table 2.

COMPARATIVE EXAMPLES 6 AND 7

The procedure of Example 1 was repeated except that ethyl silicate (Comparative Example 6) and ethyl triethoxysilane (Comparative Example 7) were used in place of cyclohexylmethyl dimethoxysilane in the contact treatment of Example 1. Contact treatment and pre-polymerization are summarized in Table 1 and results are shown in Table 2.

COMPARATIVE EXAMPLE 8

The procedure of Example 1 was repeated except that triethyl aluminum was used in place of diethyl aluminum chloride in the contact treatment of Example 1. Contact treatment and pre-polymerization was summarized in Table 1 and results are shown in Table 2.

TABLE 1

|  | Contact treatment | | Pre-polymerization | |
| --- | --- | --- | --- | --- |
|  | Kind and amount of halogenated organoaluminum compound (mmol) | Kind and amount of organosilicon compound (mmol) | Kind and amount of organoaluminum compound (mmol) | Pre-polymerization amount (g-PP/g-cat) |
| Ex. 1 | diethyl aluminum chloride (50) | cyclohexylmethyl dimethyloxysilane (2.5) | triethyl aluminum (50) | 2.1 |
| Ex. 2 | diethyl aluminum chloride (50) | dicyclopentyl dimethyloxysilane (2.5) | triethyl aluminum (50) | 2.3 |
| Ex. 3 | diethyl aluminum chloride (50) | t-butylethyl dimethyloxysilane (2.5) | triethyl aluminum (50) | 2.2 |
| Ex. 4 | diethyl aluminum chloride (50) | di-t-butyl dimethyloxysilane (2.5) | triethyl aluminum (50) | 2.3 |
| Ex. 5 | ethyl aluminum sesquichloride (50) | cyclohexylmethyl dimethyloxysilane (2.5) | triethyl aluminum (50) | 2.0 |
| Ex. 6 | diethyl aluminum chloride (10) | cyclohexylmethyl dimethyloxysilane (2.5) | triethyl aluminum (50) | 2.0 |
| Ex. 7 | diethyl aluminum chloride (25) | cyclohexylmethyl dimethyloxysilane (2.5) | triethyl aluminum (50) | 1.9 |
| Ex. 8 | diethyl aluminum chloride (50) | cyclohexylmethyl dimethyloxysilane (2.5) | triethyl aluminum (50) | 2.1 |
| Ex. 9 | diethyl aluminum chloride (50) | cyclohexylmethyl dimethyloxysilane (2.5) | triethyl aluminum (50) | 1.9 |
| Ex. 10 | diethyl aluminum chloride (50) | cyclohexylmethyl dimethyloxysilane (2.5) | triethyl aluminum (50) | 2.0 |
| Comp. Ex. 1 | — | — | triethyl aluminum (50) | 2.0 |
| Comp. Ex. 2 | diethyl aluminum chloride (50) | cyclohexylmethyl dimethoxylmethyl (2.5) | — | — |
| Comp. Ex. 3 | diethyl aluminum chloride (50) | cyclohexylmethyl dimethoxysilane (2.5) | — | — |
| Comp. Ex. 4 | diethyl aluminum chloride (50) | — | triethyl aluminum (50) | 2.0 |
| Comp. Ex. 5 | — | cyclohexylmethyl dimethyoxysilane (2.5) | triethyl aluminum (50) | 2.0 |
| Comp. Ex. 6 | diethyl aluminum chloride (50) | ethyl silicate (2.5) | triethyl aluminum (50) | 1.9 |
| Comp. Ex. 7 | diethyl aluminum chloride (50) | ethyl triethoxysilane (2.5) | triethyl aluminum (50) | 1.9 |
| Comp. Ex. 8 | triethyl aluminum (50) | cyclohexylmethyl dimethoxysilane (2.5) | triethyl aluminum (50) | 2.0 |

Ex.: Example
Comp. Ex.: Comparative Example

TABLE 2

| | Valence of Ti | | | Polymerization | | | |
|---|---|---|---|---|---|---|---|
| | Ti (2+) (atomic %) | Ti (3+) (atomic %) | Ti (4+) (atomic %) | Melt-index (g/10 min) | Polymerization activity (g-PP/g-cat) | p-xylene soluble content (wt %) | Bulk density (g/cc) |
| Ex. 1 | 19.0 | 44.5 | 36.5 | 8.3 | 45000 | 1.7 | 0.47 |
| Ex. 2 | 16.0 | 50.3 | 33.7 | 8.1 | 43000 | 1.8 | 0.47 |
| Ex. 3 | 15.4 | 47.6 | 37.0 | 8.5 | 45000 | 1.7 | 0.47 |
| Ex. 4 | 18.4 | 48.0 | 33.6 | 8.5 | 44000 | 1.7 | 0.46 |
| Ex. 5 | 14.6 | 45.0 | 40.4 | 8.3 | 42000 | 1.8 | 0.47 |
| EX. 6 | 18.8 | 46.8 | 34.4 | 7.9 | 44000 | 1.9 | 0.46 |
| Ex. 7 | 18.3 | 47.0 | 34.7 | 8.8 | 44000 | 1.7 | 0.47 |
| Ex. 8 | 17.0 | 46.0 | 37.0 | 8.2 | 45000 | 1.6 | 0.47 |
| Ex. 9 | 16.0 | 45.0 | 39.0 | 8.4 | 44000 | 1.7 | 0.47 |
| Ex. 10 | 18.0 | 43.8 | 38.2 | 8.5 | 45000 | 1.8 | 0.47 |
| Comp. Ex. 1 | 28.4 | 27.7 | 43.9 | 8.5 | 31000 | 1.8 | 0.47 |
| Comp. Ex. 2 | 1.6 | 9.5 | 88.9 | 9.5 | 35000 | 1.8 | 0.42 |
| Comp. Ex. 3 | 2.0 | 11.3 | 86.7 | 8.8 | 35000 | 1.9 | 0.44 |
| Comp. Ex. 4 | 27.9 | 30.1 | 42.0 | 8.0 | 35000 | 2.0 | 0.47 |
| Comp. Ex. 5 | 34.8 | 25.2 | 40.0 | 8.9 | 30000 | 1.7 | 0.47 |
| Comp. Ex. 6 | 29.8 | 30.6 | 39.6 | 9.1 | 31000 | 2.0 | 0.4 |
| Comp. Ex. 7 | 28.7 | 29.8 | 41.5 | 8.1 | 31000 | 1.9 | 0.47 |
| Comp. Ex. 8 | 40.2 | 28.8 | 31.0 | 8.4 | 32000 | 1.8 | 0.47 |

Ex.: Example
Comp. Ex.: Comparative Example

EXAMPLE 11

Contact treatment and pre-polymerization were carried out to obtain a solid titanium catalyst component in the same manner as in Example 1 except that the preparation of a solid titanium compound in Example 1 was carried out in accordance with the following method. Polymerization was carried out using the so-obtained solid titanium catalyst component. Contact treatment and pre-polymerization are summarized in Table 3 and results are shown in Table 4.

[preparation of solid titanium compound]

The preparation of a solid titanium compound was carried out in accordance with a method described in Example 2 of JP-A-2-229805. That is, a 2-liter container equipped with a stirrer was fully substituted with $N_2$, 700 ml of refined kerosene, 10 g of commercially available $MgCl_2$, 24.2 g of ethanol and 3 g of sorbitan distearate (trade name: Emazol 320, manufactured by Kao Atlas Co.) were charged into the container, and the resulting system was heated under stirring and stirred at 120° C. at 800 rpm for 30 minutes.

1 liter of refined kerosene was injected into a 2-liter glass flask equipped with a stirrer and cooled to −10° C.

The above refined kerosene including $MgCl_2$ was added to 1 liter of the above refined kerosene cooled to −10° C. using a 5 mm Teflon tube.

The solid matter formed was collected by filtration and fully washed with hexane to obtain a carrier.

7.5 g of the thus obtained carrier was suspended in 150 ml of titanium tetrachloride at room temperature and 1.3 ml of diisobutyl phthalate was added to the suspension, which then was heated to 120° C. After 2 hours of mixing under stirring at 120° C., a solid content was collected by filtration, suspended again in 150 ml of titanium tetrachloride, and mixed under stirring again at 130° C. for 2 hours. Then a reaction solid content was collected by filtration and washed with a sufficient amount of refined hexane to obtain a solid titanium compound.

When the solid titanium compound was analyzed, it was found that it contained 2.2% by weight, calculated as Ti atom, of titanium, 64% by weight of chlorine, 20% by weight of magnesium and 5.0% by weight of diisobutyl phthalate.

EXAMPLES 12 TO 14

The procedure of Example 11 was repeated except that dicyclopentyl dimethoxysilane (Example 12), t-butylethyl dimethoxysilane (Example 13) and di-t-butyl dimethoxysilane (Example 14) were used in place of cyclohexylmethyl dimethoxysilane used in the contact treatment of Example 11. Contact treatment and pre-polymerization are summarized in Table 3 and results are shown in Table 4.

TABLE 3

| | Contact treatment | | Pre-polymerization | |
|---|---|---|---|---|
| | Kind and amount of halogenated organoaluminum compound (mmol) | Kind and amount of organosilicon compound (mmol) | Kind and amount of organoaluminum compound (mmol) | Pre-polymerization amount (g-PP/g-cat) |
| Ex. 11 | diethyl aluminum chloride (50) | cyclohexylmethyl dimethoxylsilane (2.5) | triethyl aluminum (50) | 1.9 |
| Ex. 12 | diethyl aluminum chloride (50) | dicyclopentyl dimethoxylsilane (2.5) | triethyl aluminum (50) | 1.9 |
| Ex. 13 | diethyl aluminum chloride (50) | t-butylethyl dimethoxylsilane (2.5) | triethyl aluminum (50) | 2.1 |
| Ex. 14 | diethyl aluminum chloride (50) | di-t-butylethyl dimethoxylsilane (2.5) | triethyl aluminum (50) | 2.0 |

Ex.: Example

TABLE 4

| | Valence of Ti | | | Polymerization | | | |
|---|---|---|---|---|---|---|---|
| | Ti (2+) (atomic %) | Ti (3+) (atomic %) | Ti (4+) (atomic %) | Melt-index (g/10 min) | Polymerization activity (g-PP/g-cat) | p-xylene soluble content (wt %) | Bulk density (g/cc) |
| Ex. 11 | 19.2 | 46.1 | 34.7 | 9.0 | 43000 | 2.3 | 0.45 |
| Ex. 12 | 16.4 | 48.3 | 35.6 | 6.0 | 44000 | 2.1 | 0.45 |
| Ex. 13 | 17.3 | 46.0 | 36.7 | 7.5 | 43000 | 2.1 | 0.45 |
| Ex. 14 | 16.8 | 42.4 | 40.8 | 9.4 | 43000 | 2.4 | 0.45 |

Ex.: Example

EXAMPLE 15

Polymerization was carried out in the same manner as in Example 1 after the solid titanium compound obtained by the pre-polymerization of Example 1 was contacted with t-butyl chloride as a halogenating agent under the conditions below (summarized in Table 5). Results are shown in Table 5.

[contact]

600 ml of refined n-hexane, 5 mmol, calculated as Ti atom, in terms of titanium atom of the solid titanium compound obtained by pre-polymerization and 5 mmol of t-butyl chloride were charged into a 1-liter autoclave substituted with $N_2$ and stirred for 1 hour while the temperature was maintained at 10° C. A solid content of the resulting slurry was washed four times with refined n-hexane.

As shown in the results of Table 5, reactivity of the solid titanium compound of this Example with propylene was extremely low, compared with the solid titanium catalyst component obtained by the pre-polymerization of Example 1.

EXAMPLES 16 TO 20

The procedure of Example 15 was repeated except that iodine (Example 16), ethyl aluminum dichloride (Example 17), ethyl sesquichloride (Example 18), benzyl chloride (Example 19) and sec-butyl chloride (Example 20) were used in place of t-butyl chloride used in the contact treatment of Example 12. The summary of contact treatment conditions and the results are shown in Table 5.

EXAMPLES 21 AND 22

The procedure of Example 15 was repeated except that the molar ratio of t-butyl chloride in the contact treatment of Example 15 was changed to 0.5 mmol (Example 21) and 50 mmol (Example 22). The summary of contact treatment conditions and the results are shown in Table 5.

EXAMPLE 23

The procedure of Example 15 was repeated except that the contact time of Example 15 was changed to 120 minutes. The summary of contact treatment conditions and the results are shown in Table 5.

COMPARATIVE EXAMPLES 9 TO 11

The procedure of Example 15 was repeated except that diisobutyl phthalate (Comparative Example 9), cyclohexylmethyl dimethoxysilane (Comparative Example 10) and 100 ml of a carbon dioxide gas (Comparative Example 11) were used in place of t-butyl chloride used in the contact treatment of Example 15. The summary of contact treatment conditions and the results are shown in Table 5.

As shown in the results of Table 5, it is understood that, when a solid titanium compound component is contacted with a compound other than a halogenating agent, its polymerization activity deteriorates considerably.

TABLE 6

| | Conditions of contact with halogenating agent | | Reactivity of solid titanium catalyst | Polymerization | | |
|---|---|---|---|---|---|---|
| | Kind and amount of halogenating agent (mmol) | Contact time (min) | component with propylene (g-PP/g-cat) | Melt-index (g/10 min) | Polymerization activity (g-PP/g-cat) | P-xylene soluble content (wt %) | Bulk density (g/cc) |

| | Kind and amount of halogenating agent (mmol) | Contact time (min) | component with propylene (g-PP/g-cat) | Melt-index (g/10 min) | Polymerization activity (g-PP/g-cat) | soluble content (wt %) | Bulk density (g/cc) |
|---|---|---|---|---|---|---|---|
| Ex. 15 | t-butyl chloride (5) | 60 | 0.2 | 8.6 | 43000 | 1.9 | 0.47 |
| Ex. 16 | iodine (5) | 60 | 1.4 | 8.9 | 45000 | 1.8 | 0.47 |
| Ex. 17 | ethyl aluminum dichloride (5) | 60 | 2.0 | 8.1 | 45000 | 1.8 | 0.47 |
| Ex. 18 | ethyl aluminum sesquichloride (5) | 60 | 2.0 | 8.9 | 45000 | 1.9 | 0.47 |
| Ex. 19 | benzyl chloride (5) | 60 | 2.7 | 8.7 | 43000 | 1.8 | 0.47 |
| Ex. 20 | sec-butyl chloride (5) | 60 | 0.5 | 8.6 | 45000 | 1.9 | 0.47 |
| Ex. 21 | t-butyl chloride (0.5) | 60 | 1.2 | 9.0 | 45000 | 1.8 | 0.47 |
| Ex. 22 | t-butyl chloride (50) | 60 | 0.1 | 8.2 | 43000 | 2.0 | 0.47 |
| Ex. 23 | t-butyl chloride (5) | 120 | 0.1 | 8.3 | 44000 | 2.0 | 0.47 |
| Comp. Ex. 9 | diisobutyl phthalate (5) | 120 | 3.8 | 8.7 | 34000 | 2.2 | 0.47 |
| Comp. Ex. 10 | cychlohexylmethyl dimethyoxysilane (5) | 120 | 9.8 | 8.8 | 37000 | 1.9 | 0.47 |
| Comp. Ex. 11 | carbon dioxide gas (100 ml) | 120 | 1.2 | 8.9 | 27000 | 2.0 | 0.47 |

Ex.: Example
Comp. Ex.: Comparative Example

What is claimed is:

1. An olefin polymerization catalyst comprising:

(A) a solid titanium catalyst component comprising a magnesium atom, titanium atom, halogen atom and electron donor, in which divalent titanium atom account for not more than 25 atomic % of the whole titanium atom and trivalent titanium atom account for at least 30 atomic % of the whole titanium atom, wherein said solid titanium catalyst component is obtained by pre-polymerizing an olefin in the presence of an organoaluminum compound having no halogen atom and a solid titanium compound component obtained by contacting (a) a solid titanium compound containing a magnesium atom, tetravalent titanium atom, halogen atom and electron donor, (b) a halogenated organoaluminum compound represented by the following formula (1):

$$R_nAlX_{3-n} \quad (1)$$

wherein R is a saturated hydrocarbon group having 1 to 10 carbon atoms, X is a halogen atom and n is a number that satisfies 0<n<3,
    and (c) an organosilicon compound represented by the following formula (2):

$$R^1R^2Si(OR^3)_2 \quad (2)$$

wherein $R^1$, $R^2$ and $R^3$ are the same or different hydrocarbon groups having 1 to 20 carbon atoms, provided that at least one of $R^1$ and $R^2$ is a chain hydrocarbon group having a tertiary carbon atom directly bonded to a silicon atom (Si) or a cyclic hydrocarbon group having a secondary carbon atom directly bonded to a silicon atom; and (B) an organoaluminum compound component having no halogen atom.

2. The olefin polymerization catalyst according to claim 1, wherein tetravalent titanium atom account for at least 5 atomic % of the whole titanium atom contained in the solid titanium catalyst component (A).

3. The olefin polymerization catalyst according to claim 1, wherein pre-polymerization is carried out at a polymerization rate of 0.01 to 1.0 g of polymer/g-cat.min. in an amount of 0.1 to 100 g of polymer/g of the catalyst.

4. The olefin polymerization catalyst according to claim 1, which is obtained by washing after pre-polymerization.

5. The olefin polymerization catalyst according to claim 1, wherein the halogenated organic aluminum compound is selected from the group consisting of ethyl aluminum dichloride, ethyl aluminum sesquichloride, diethyl aluminum chloride, diethyl aluminum bromide, diethyl aluminum iodide, diisobutyl aluminum chloride, di-n-propyl aluminum chloride, ethyl aluminum dibromide, ethyl aluminum diiodide, isobutyl aluminum dichloride, isobutyl aluminum dibromide, and isobutyl aluminum diiodide.

6. The olefin polymerization catalyst according to claim 1, wherein the atomic ratio of aluminum atom contained in the halogenated organoaluminum compound to titanium atom contained in the solid titanium compound to be contacted therewith is 0.1 to 100.

7. The olefin polymerization catalyst according to claim 1, wherein $R^1$, $R^2$ or $R^3$ in formula (2) is selected from the group consisting of methyl, ethyl, propyl, isopropyl, butyl, isobutyl, sec-butyl, pentyl, isopentyl, neopentyl, hexyl, heptyl, octyl, nonyl, decyl, cyclopentyl, alkyl group-substituted cyclopentyl, cyclohexyl, alkyl group-substituted cyclohexyl, t-butyl and t-amyl.

8. The olefin polymerization catalyst according to claim 1, wherein the chain hydrocarbon group having a tertiary carbon atom directly bonded to a silicon atom, represented by at least one of $R^1$ and $R^2$ in formula (2), is t-butyl or t-amyl.

9. The olefin polymerization catalyst according to claim 1, wherein the cyclic hydrocarbon group having a secondary carbon atom directly bonded to a silicon atom is selected from a group consisting of 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl, tetraethylcyclopentyl, cyclohexyl, 2-methylcyclohexyl, 3-methylcyclohexyl, 4-methylcyclohexyl, 2-ethylcyclohexyl, 2,3-dimethylcyclohexyl, 2,4-dimethylcyclohexyl, 2,5-dimethylcyclohexyl, 2,6-dimethylcyclohexyl, 2,3-diethylcyclohexyl, 2,3,4-trimethylcyclohexyl, 2,3,5-trimethylcyclohexyl, 2,3,6-trimethylcyclohexyl, 2,4,5-trimethylcyclohexyl, 2,4,6-trimethylcyclohexyl, 2,3,4-triethylcyclohexyl, 2,3,4,5-tetramethylcyclohexyl, 2,3,4,6-tetramethylcyclohexyl, 2,3,5,6-tetramethylcyclohexyl, 2,3,4,5-tetraethylcyclohexyl, pentamethylcyclohexyl and pentaethylcyclohexyl.

10. The olefin polymerization catalyst according to claim 1, wherein the organosilicon compound is selected from the group consisting of di-t-butyl dimethoxysilane, t-butylethyl dimethoxysilane, di-t-amyl dimethoxysilane, dicyclopentyl dimethoxysilane, dicyclohexyl dimethoxysilane, di(2-methylcyclopentyl)dimethoxysilane, di(3-methylcyclopentyl)dimethoxysilane, di(2-ethylcyclopentyl)dimethoxysilane, di(2,3-dimethylcyclopentyl)dimethoxysilane, di(2-4-dimethylcyclopentyl)dimethoxysilane, di(2,5-dimethylcyclopentyl)dimethoxysilane, di(2,3-diethylcyclopentyl)dimethoxysilane, di(2,3,4-trimethylcyclopentyl)dimethoxysilane, di(2,3,5-trimethylcyclopentyl)dimethoxysilane, di(2,3,4-triethylcyclopentyl)dimethoxysilane, di(tetramethylcyclopentyl)dimethoxysilane, di(tetraethylcyclopentyl)dimethoxysilane, di(2-methylcyclohexyl)dimethoxysilane, di(3-methylcyclohexyl)dimethoxysilane, di(4-methylcyclohexyl)dimethoxysilane, di(2-ethylcyclohexyl)dimethoxysilane, di(2,3-dimethylcyclohexyl)dimethoxysilane, di(2,4-dimethylcyclohexyl)dimethoxysilane, di(2,5-dimethylcyclohexyl)dimethoxysilane, di(2,6-dimethylcyclohexyl)dimethoxysilane, di(2,3-diethylcyclohexyl)dimethoxysilane, di(2,3,4-trimethylcyclohexyl)dimethoxysilane, di(2,3,5-trimethylcyclohexyl)dimethoxysilane, di(2,3,6-trimethylcyclohexyl)dimethoxysilane, di(2,4,5-trimethylcyclohexyl)dimethoxysilane, di(2,4,6-trimethylcyclohexyl)dimethoxysilane, di(2,3,4-triethylcyclohexyl)dimethoxysilane, di(2,3,4,5-tetramethylcyclohexyl)dimethoxysilane, di(2,3,4,6-tetramethylcyclohexyl)dimethoxysilane, di(2,3,5,6-tetramethylcyclohexyl)dimethoxysilane, di(2,3,4,5-tetraethylcyclohexyl)dimethoxysilane, di(pentamethylcyclohexyl)dimethoxysilane, di(pentaethylcyclohexyl)dimethoxysilane, t-butylmethyl dimethoxysilane, t-butylethyl dimethoxysilane, t-amylmethyl dimethoxysilane, cyclopentylmethyl dimethoxysilane, cyclopentylethyl dimethoxysilane, cyclopentylisobutyl dimethoxysilane, cyclohexylmethyl dimethoxysilane, cyclohexylethyl dimethoxysilane, and cyclohexylisobutyl dimethoxysilane.

11. The olefin polymerization catalyst according to claim 1, wherein the atomic ratio of silicon atom contained in the organosilicon compound to titanium atom contained in the solid titanium compound to the contacted therewith is 0.01 to 100.

12. An olefin polymerization catalyst consisting essentially of:

(A) a solid titanium catalyst component comprising a magnesium atom, titanium atom, halogen atom and electron donor, in which divalent titanium atom account for not more than 25 atomic % of the whole titanium atom and trivalent titanium atom account for at least 30 atomic % of the whole titanium atom, wherein said solid titanium catalyst component is obtained by pre-polymerizing an olefin in the presence of an organoaluminum compound having no halogen atom and a solid titanium compound component obtained by contacting (a) a solid titanium compound containing a magnesium atom, tetravalent titanium atom, halogen atom and electron donor, (b) a halogenated organoaluminum compound represented by the following formula (1):

$$R_nAlX_{3-n} \quad (1)$$

wherein R is a saturated hydrocarbon group having 1 to 10 carbon atoms, X is a halogen atom and n is a number that satisfies 0>n>3, and (c) an organosilicon compound represented by the following formula (2):

$$R^1R^2Si(OR^3)_2 \quad (2)$$

wherein $R^1$, $R^2$ and $R^3$ are the same or different hydrocarbon groups having 1 to 20 carbon atoms, provided that at least one of $R^1$ and $R^2$ is a chain hydrocarbon group having a tertiary carbon atom directly bonded to a silicon atom (Si) or a cyclic hydrocarbon group having a secondary carbon atom directly bonded to a silicon atom; and (B) an organoaluminum compound component having no halogen atom.

13. An olefin polymerization catalyst comprising:

component (A) consisting of a solid titanium catalyst component comprising a magnesium atom, titanium atom, halogen atom and electron donor, in which divalent titanium atom account for not more than 25 atomic % of the whole titanium atom and trivalent titanium atom account for at least 30 atomic % of the whole titanium atom, wherein said solid titanium catalyst component is obtained by pre-polymerizing an olefin in the presence of an organoaluminum compound having no halogen atom and a solid titanium compound component obtained by contacting (a) a solid titanium compound containing a magnesium atom, tetravalent titanium atom, halogen atom and electron donor, (b) a halogenated organoaluminum compound represented by the following formula (1):

$$R_nAlX_{3-n} \quad (1)$$

wherein R is a saturated hydrocarbon group having 1 to 10 carbon atoms, X is a halogen atom and n is a number that satisfies 0>n>3, and (c) an organosilicon compound represented by the following formula (2):

$$R^1R^2Si(OR^3)_2 \quad (2)$$

wherein $R^1$, $R^2$ and $R^3$ are the same or different hydrocarbon groups having 1 to 20 carbon atoms, provided that at least one of $R^1$ and $R^2$ is a chain hydrocarbon group having a tertiary carbon atom directly bonded to a silicon atom (Si) or a cyclic hydrocarbon group having a secondary carbon atom directly bonded to a silicon atom; and component (B) comprising an organoaluminum compound component having no halogen atom.

14. An olefin production method which comprises polymerizing an olefin in the presence of the olefin polymerization catalyst of claim 1.

15. A polyolefin production method according to claim 14, wherein the polymerization is carried out at a polymerization rate of 10 to 1,000 g of polymer/g-cat.min.

16. A polyolefin production method which comprises bringing a solid titanium catalyst into contact with a halogenating agent and supplying them to a polymerization zone through a feed pipe in the method of claim 14 when the solid titanium catalyst is to be supplied through the feed pipe to the polymerization zone together with an olefin to produce a polyolefin.

* * * * *